(12) United States Patent
Van Doren et al.

(10) Patent No.: US 7,051,163 B2
(45) Date of Patent: May 23, 2006

(54) DIRECTORY STRUCTURE PERMITTING EFFICIENT WRITE-BACKS IN A SHARED MEMORY COMPUTER SYSTEM

(75) Inventors: Stephen R. Van Doren, Northborough, MA (US); Gregory E. Tierney, Chelmsford, MA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 390 days.

(21) Appl. No.: 10/263,739

(22) Filed: Oct. 3, 2002

(65) Prior Publication Data

US 2004/0068620 A1 Apr. 8, 2004

(51) Int. Cl.
*G06F 12/00* (2006.01)

(52) U.S. Cl. .................................... 711/141
(58) Field of Classification Search ............ 707/8, 707/10, 201; 709/213, 214, 215; 711/133–135, 711/141–145, 147, 148, 151, 153, 156, 159
See application file for complete search history.

(56) References Cited

U.S. PATENT DOCUMENTS

| | | | |
|---|---|---|---|
| 4,847,804 A | 7/1989 | Shaffer et al. | |
| 5,222,224 A | 6/1993 | Flynn et al. | |
| 5,233,616 A * | 8/1993 | Callander | 714/758 |
| 5,297,269 A | 3/1994 | Donaldson et al. | |
| 5,303,362 A * | 4/1994 | Butts et al. | 711/121 |
| 5,313,609 A * | 5/1994 | Baylor et al. | 711/121 |
| 5,490,261 A | 2/1996 | Bean et al. | |
| 5,530,933 A | 6/1996 | Frink et al. | |
| 5,537,575 A | 7/1996 | Foley et al. | |
| 5,551,005 A | 8/1996 | Sarangdhar et al. | |
| 5,579,504 A | 11/1996 | Callander et al. | |
| 5,608,893 A | 3/1997 | Slingwine et al. | |
| 5,737,757 A | 4/1998 | Hassoun et al. | |
| 5,761,731 A | 6/1998 | Van Doren et al. | |
| 5,905,998 A | 5/1999 | Ebrahim et al. | |
| 6,014,690 A | 1/2000 | VanDoren et al. | |
| 6,055,605 A | 4/2000 | Sharma et al. | |
| 6,061,765 A | 5/2000 | Van Doren et al. | |

(Continued)

FOREIGN PATENT DOCUMENTS

EP 0 817 074 A1 7/1998

OTHER PUBLICATIONS

Gharachorloo, K., Lenoski, D., Laudon, J., Gibbons, P., Gupta, A. and Hennessey, J., Memory Consistency and Event Ordering in Scalable Shared-Memory Multiprocessors, (c) 1990 IEEE, pp. 15-26.

(Continued)

*Primary Examiner*—Christian P. Chace

(57) ABSTRACT

A directory maintains status information over memory blocks in a shared memory computer system. The directory has a plurality of entries each corresponding to a respective block, and is organized into a main region and a write-back region. The main region has an owner field, identifying the current owner of the block. The write-back region has a writer field identifying the last owner to have written the block back to memory. To write a block back to memory, the owner enters its identifier in the writer field and writes the data back to memory without checking nor modifying the owner field. In response to a memory operation, if the contents of the owner field and the writer field match, memory concludes that it is the owner, otherwise memory concludes that the entity identified in the owner field is the owner.

21 Claims, 8 Drawing Sheets

| | DIRECTORY 420 | | | | | | | |
|---|---|---|---|---|---|---|---|---|
| | MAIN DIRECTORY REGION 702 | | | | | WRITE-BACK DIRECTORY REGION 704 | | |
| | OWNER/ SHARER 714 | SHARER LIST 716 | | UNUSED 718 | ECC 720 | WRITER 722 | UNUSED 724 | ECC 726 |
| | | SHARER 0 716a | SHARER 1 716b | | | | | |
| | | (SHARER VECTOR) 716c | | | | | | |
| 706a | MEMORY | 0 | 0 | 0 | - | MEMORY | 0 | - |
| 706b | MEMORY | P0 | 0 | 0 | - | MEMORY | 0 | - |
| 706c | P0 | 0 | 0 | 0 | - | MEMORY | 0 | - |
| 706d | P0 | P1 | 0 | 0 | - | MEMORY | 0 | - |
| 706e | P2 | 0 | 0 | 0 | - | MEMORY | 0 | - |
| 706f | P2 | 0 | 0 | 0 | - | P2 | 0 | - |
| 706g | P2 | P3 | 0 | 0 | - | P2 | 0 | - |
| 706h | P2 | 0 | 0 | 0 | - | 0 | 0 | - |
| 707 | P9 | P12 | 0 | 0 | - | MEMORY | 0 | - |
| 708 | P6 | 0100110000000000 | | 0 | - | MEMORY | 0 | - |
| 709 | P10 | 0 | 0 | 0 | - | P12 | 0 | - |
| 710 | P8 | 0000100000100010 | | 0 | - | MEMORY | 0 | - |

U.S. PATENT DOCUMENTS

| | | | |
|---|---|---|---|
| 6,088,771 | A | 7/2000 | Steely, Jr. et al. |
| 6,094,686 | A | 7/2000 | Sharma |
| 6,101,420 | A | 8/2000 | VanDoren et al. |
| 6,105,108 | A | 8/2000 | Steely, Jr. et al. |
| 6,108,737 | A | 8/2000 | Sharma et al. |
| 6,108,752 | A * | 8/2000 | VanDoren et al. .......... 711/117 |
| 6,125,429 | A | 9/2000 | Goodwin et al. |
| 6,154,816 | A | 11/2000 | Steely et al. |
| 6,202,126 | B1 | 3/2001 | Van Doren et al. |
| 6,249,520 | B1 | 6/2001 | Steely, Jr. et al. |
| 2002/0004886 | A1* | 1/2002 | Hagersten et al. .......... 711/141 |

OTHER PUBLICATIONS

Jouppi, N., Improving Direct-Mapped Cache Performance by the Addition of a Small Fully-Associative Cache and Prefetch Buffers, (c) 1990 IEEE, pp. 364-373.

Agarwal, A., Simoni, R., Hennesy, J. and Horowitz, M., An Evaluation of Directory Schemes for Cache Coherence, (c)1988 IEEE, pp. 353-362.

Papapanaroos, M. and Patel, J., A Low-Overhead Coherence Solution for Multiprocessors with Private Cache Memories, (c) 1984 IEEE, pp. 284-290.

UltraSPARC Ultra Port Architecture (UPA): The New-Media System Architecture, http://www.sun.com/processors/whitepapers/wp95-023.html, Copyright 1994-2002 Sun Microsystems, pp. 1-4.

Porting OpenVMS Applications to Intel Itanium Architecture, Compaq Conputer Corporation, Apr. 2002, pp. 1-17.

Adve, S., Hill, M., Miller, B. and Nester, R., Detecting Data Races on Weak Memory Systems,(c) 1991 ACM, pp. 234-243.

Gharachorloo, K., Sharma, M., Steely, S. and Van Doren, S., Architecture and Design of AlphaServer GS320, Nov. 2000, pp. 1-12.

IEEE Standard for Scalable Coherent Interface (SCI), (c) 1993 IEEE, pp. Table of Contents, 30-34 and 141-188.

Scales, D. and Gharachorloo, K., Design and Performance of the Shasta Distributed Shared Memory Protocol, XP-000755264, Jul. 7, 1997, pp. 245-252.

Scales, D., Gharachorloo, K. and Thekkath, C., Shasta: A Low Overhead, Software-Only Approach for Supporting Fine-Grain Shared Memory, XP-002173083, Jan. 10, 1996, pp. 174-185

Scales, D. and Gharachorloo, K., Towards Transparent and Efficient Software Distributed Shared Memory. XP-000771029, Dec. 1997, pp. 157-169.

Scales, D., Gharachorloo, K. and Aggarwal, A., Fine-Grain Software Distributed Shared Memory on SMP Clusters, WRL Research Report 97/3, Feb. 1997, pp. i and 1-28.

* cited by examiner

| | MAIN DIRECTORY REGION 702 | | | | | WRITE-BACK DIRECTORY REGION 704 | |
|---|---|---|---|---|---|---|---|
| | | SHARER LIST 716 | | UNUSED 718 | ECC 720 | WRITER 722 | UNUSED 724 | ECC 726 |
| | OWNER/ SHARER 714 | SHARER 0 716a | SHARER 1 716b (SHARER VECTOR) 716c | | | | |
| 706a | MEMORY | 0 | 0 | 0 | - | MEMORY | 0 | - |
| 706b | MEMORY | P0 | 0 | 0 | - | MEMORY | 0 | - |
| 706c | P0 | 0 | 0 | 0 | - | MEMORY | 0 | - |
| 706d | P0 | P1 | 0 | 0 | - | MEMORY | 0 | - |
| 706e | P2 | 0 | 0 | 0 | - | P2 | 0 | - |
| 706f | P2 | P3 | 0 | 0 | - | P2 | 0 | - |
| 706g | P2 | 0 | 0 | 0 | - | 0 | 0 | - |
| 706h | P2 | P12 | 0 | 0 | - | MEMORY | 0 | - |
| 707 | P9 | 0 | 0 | 0 | - | MEMORY | 0 | - |
| 708 | P6 | 0100011100000000000 | 0 | - | P12 | 0 | - |
| 709 | P10 | 0 | 0 | 0 | - | MEMORY | 0 | - |
| 710 | P8 | 000001000001000010 | 0 | - | MEMORY | 0 | - |

706a–706h grouped as 706

FIG. 7

DIRECTORY STRUCTURE PERMITTING EFFICIENT WRITE-BACKS IN A SHARED MEMORY COMPUTER SYSTEM

BACKGROUND OF THE INVENTION

1. Field of the Invention

The present invention relates to multiprocessor computer systems and, more specifically, to a directory for maintaining status information over data stored in a multiprocessor computer system.

2. Background Information

A computer system typically comprises one or more processors linked to a main memory by a bus or other interconnect. In most computer systems, main memory organizes the instructions and data being stored into units typically referred to as "blocks", each of which is separately addressable and may be of a fixed size. Instructions and data are typically moved about the computer system in terms of one or more blocks.

Ordinarily, a processor will retrieve data, e.g., one or more blocks, from main memory, perform some operation on it, and eventually return the results back to main memory. Retrieving data from main memory and providing it to a processor can take significant time especially in terms of the high operating speeds of processors. To reduce such latencies as well as to reduce the number of times a processor must access main memory, modern processors and/or processor chipsets include one or more cache memories or caches. A cache is a small, fast memory module that is placed in close proximity to the processor. Many caches are static random access memories (SRAMs), which are faster, but more expensive, than dynamic random access memories (DRAMs), which are often used for main memory. The cache is used to store information, e.g., data or instructions, which the processor is currently using or is likely to use in the near future. There are two basic types of caches: "write-through" caches and "write-back" caches.

With a write-through cache, whenever a processor modifies or updates a piece of data in the processor's cache, main memory's copy of that data is automatically updated. This is accomplished by having the processor write the data back to memory whenever the data is modified or updated. Utilization of a write-through cache means that main memory always has the most up-to-date version of data. Nonetheless, a write-through cache forces the processor to constantly interrupt its current task or thread in order to write data back to memory as soon as it is modified. The write-through cache may also impose significant burdens on the processor to memory interconnect, degrading system performance.

A write-back cache, in contrast, does not automatically send modified or updated data to main memory. Instead, the updated data remains in the cache until some more convenient time, e.g., when the processor is idle, at which point the modified data is written back to memory. The utilization of write-back caches typically improves system performance. In some systems, a write-back or victim buffer is provided in addition to the cache. Victim data refers to modified data that is being removed from the processor's cache in order to make room for new data received at the processor. Typically, the data selected for removal from the cache is data the processor is no longer using. The victim buffer stores this modified data which is waiting to be written back to main memory. The use of a victim buffer frees up space in the cache for data that is being used or will be used by the processor. Modified data in the victim buffer is eventually "victimized", i.e., written back to main memory, at some convenient time.

Although the implementation of write-back or victim buffers have increased the performance of computer systems, there are some drawbacks. For example, the addition of a victim buffer requires additional storage or memory space at the processor chipset increasing cost, complexity and size of the processor chipset.

Symmetrical Multiprocessor (SMP) Systems

Multiprocessor computing systems, such as symmetrical multiprocessor (SMP) systems, provide a computer environment in which software applications may run on a plurality of processors using a single address space or shared memory abstraction. In a shared memory system, each processor can access any data item without a programmer having to worry about where the data is or how to obtain its value. This frees the programmer to focus on program development rather than on managing partitioned data sets and communicating values.

Cache Coherency

Because more than one processor of the SMP system may request a copy of the same memory block from main memory, cache coherency protocols have been developed to ensure that no processor relies on a memory block that has become stale, typically due to a modification or update performed to the block by some other processor. Many cache coherency protocols associate a state with each cache line. A given memory block, for example, may be in a shared state in which copies of the block may be present in the caches associated with multiple processors. When a memory block is in the shared state, a processor may read from, but not write to, the respective block. To support write operations, a memory block may be in an exclusive state. In this case, the block is owned by a single processor which may write to the cache line. When the processor updates or modifies the block, its copy becomes the most up-to-date version, while corresponding copies of the memory block at main memory and/or other processor caches become stale.

When a processor wishes to obtain exclusive ownership over a memory block that is currently in the shared state (i.e., copies of the block are present in the caches of other processors), invalidate requests are typically issued to those other processors. When an invalidate request is received by a given processor, its cache is searched for the specified memory block. If the specified block is found, it is transitioned to an invalid state. Many caches assign or associate a valid bit with each memory block or cache line stored in the cache. If the bit is asserted, then the cache line is considered to be valid and may be accessed and utilized by the processor. When a memory block is initially received from main memory, the valid bit is typically asserted and the memory block is stored in the cache. When an invalidate request is received, the valid bit of the respective cache line is de-asserted, thereby indicating that the cache line is no longer valid.

There are two classes of cache coherency protocols: snooping and directory based. With snooping, the caches monitor or snoop all transactions traversing the shared memory bus, looking for those transactions that reference a memory block stored at the cache. If such a transaction is detected, the cache updates the status information for its copy of the memory block. In this way, every cache that has a copy of a given memory block also has a copy of the status information of that block. With a directory based protocol, the sharing status of all blocks is kept in a single, centralized location in the system, called a directory. Sharing status is not maintained in the individual caches.

FIG. 1 is a highly schematic illustration of a prior art directory 100. Directory 100 has a plurality of entries 102a–d each of which corresponds to a respective memory block. The directory 100 is organized, moreover, such that each entry 102a–d has a plurality of fields or cells for storing state and/or status information for the respective block. In particular, the directory 100 has an address column 103 that stores the address of the memory block, an owner column 104 that stores the identity of the entity, e.g., a processor or main memory itself, that is considered to be the owner of the memory block, and a sharer column 106 that stores the identity of those processors or other system entities that have a shared copy of the block.

The sharer column 106 may have a plurality of sub-columns 106a–c, each of which may contain the identity of a particular processor that has a shared copy of the respective memory block. If a request for shared access to a memory block is received from a first processor, P1, main memory examines the directory entry, e.g., entry 102c, for the block to determine its owner. As memory is itself the owner of the block, memory sends its copy of the block to P1 and enters P1's identifier (ID) into one of the sharer fields, e.g. field 106b, of the respective directory entry, e.g., entry 102c, thereby noting that P1 has a shared copy of the block. Since P1 only requested shared access to the memory block, the contents of the entry's owner field 104 are not modified.

If P1 issues a request for exclusive or write access to some other memory block, e.g., the block corresponding to entry 102d, main memory again examines the contents of entry 102d. Suppose that, at the time the request is received, the owner field reflected that memory was the owner of the memory block as shown in parentheses. In this case, memory sends the block to P1, and replaces the contents of the owner field 104 with P1's ID to reflect that P1, rather than memory, is now the owner of the memory block. P1 may then modify or update the memory block. If a request from a second processor, P2, is subsequently received for a shared copy of this memory block, main memory examines entry 102d of the directory 100 and determines that P1 is the owner of the memory block. Because its copy of the memory block, i.e., the copy stored at memory, may be stale, memory does not forward its copy to P2. Instead, memory may be configured to forward the request to P1 and add P2's ID to one of the sharer fields, e.g., field 106a. In response to the forwarded request, P1 may then supply P2 with a copy of the modified memory block from P1's cache. Alternatively, memory may be configured to force P1 to relinquish ownership of the memory block and return the modified version to memory so that memory can send a copy of the up-to-date version to P2.

It has been recognized that a computer system's cache coherency protocol is a key factor in the system's ultimate performance. Poorly designed cache coherency protocols can result in latencies, bottlenecks, other inefficiencies and/or higher complexity, each of which may reduce performance and/or increase cost. Bottlenecks, for example, often arise in high occupancy controllers, such as directory controllers. "Occupancy" is a term of art and refers to the amount of time a controller is unavailable, e.g., for the servicing of requests, following receipt of an earlier request.

In some cache coherency protocols, when a directory controller receives a request corresponding to a memory block, it thereafter becomes unavailable to service other requests for that memory block until certain acknowledgements to the earlier request are received back at the directory controller. The resulting delays can adversely affect system performance. In response, efforts have been made to design low occupancy cache coherency protocols. A low occupancy protocol allows multiple requests to the same memory block to be executing substantially simultaneously within the computer system. U.S. Pat. No. 6,154,816, issued Nov. 28, 2000, for a LOW OCCUPANCY PROTOCOL FOR MANAGING CONCURRENT TRANSACTIONS WITH DEPENDENCIES, which is commonly owned with the present invention, describes a low occupancy cache coherency protocol.

Read-Modify-Write

As described above, when an owner processor, such as P1 is finished with a memory block that it modified, the processor writes the modified memory block back to main memory. To write-back data from its write-back or victim buffer, the processor typically performs an atomic read-modify-write operation. Suppose, for example, that P1 is writing back to memory the modified memory block corresponding to directory entry 102d. P1 first reads the contents of the owner field 104 for entry 102d and compares this value to its own ID. If the value read from the owner field 104 matches P1's ID, then P1 can proceed with the write-back. Next, P1 modifies the owner field 104 of entry 102d by entering the ID associated with memory into this field. P1 then writes the modified memory block back into memory. By updating the owner field 104 with the ID assigned to main memory, P1 ensures that memory will now consider itself to be the owner of the cache line. Subsequent requests for copies of the memory block can thus be serviced by memory as it now has the most up-to-date version of the cache line.

If, during the write-back operation, P1 determines that the value stored at the owner field 104 does not match P1's ID, then P1 concludes that some entity other than P1 has somehow become the owner of the memory block. In this case, P1's copy of the cache line may no longer be the most up-to-date version. Accordingly, P1 aborts the write-back operation and neither updates the owner field 104 nor writes its copy of the data back to memory.

As shown, the utilization of an atomic read-modify-write operation to execute a write-back ensures that the status information in the directory is correct. However, the need to perform an atomic read-modify-write operation for every write-back results in the consumption of significant bandwidth on the bus connecting the processor to the main memory. Accordingly, a need exists for performing write-backs from a processor cache to main memory in a more efficient manner.

SUMMARY OF THE INVENTION

Briefly, the invention relates to a novel directory structure for use in a shared memory computer system, such as a symmetrical multiprocessor (SMP) computer system. The SMP system may comprise one or more nodes each having a plurality of processors and a plurality of shared main memory subsystems coupled together by an interconnect fabric. The memory subsystems are configured to store data in terms of memory blocks, and each processor has a cache for storing copies of memory blocks being used by the processor. Each processor further includes a miss address file (MAF) that keeps track of requests issued to a memory subsystem for a memory block not currently stored in the processor's cache. Each memory subsystem, moreover, has a memory controller and a directory for maintaining owner and sharer status information for the memory blocks for which the memory subsystem is responsible, i.e., those memory blocks for which the memory subsystem is the "home" memory.

In accordance with the invention, the directory is specifically configured to permit the efficient write-back of an updated memory block from a processor's cache to the block's home memory subsystem. In particular, the directory, which has a plurality of entries each of which is assigned to a respective memory block, is organized into a main directory region and a write-back directory region. In the main directory region, each entry has a single owner/sharer field and one or more sharer fields or a sharer vector. The owner/sharer field indicates which entity, e.g., processor, is the owner of the block. The sharer fields or vector indicate which entities, e.g., processors, have a shared copy of the memory block in their caches. In the write-back directory region, each entry has a writer field identifying the last owner to have written the memory block back to the memory subsystem.

Upon initialization of a memory subsystem, the directory is populated to indicate that the memory subsystem is the owner of each memory block for which it is the home memory. Specifically, for each entry, the owner/sharer field, and the writer field are both loaded with an identifier (ID) that has been assigned to the memory subsystem. When a first processor requests write access over a given memory block, the owner/sharer field is overwritten with the ID assigned to the first processor, thereby reflecting that the first processor is now the owner of the memory block and has the most up-to-date copy. The entry's writer field, however, is left unchanged. That is, it continues to hold the ID assigned to the memory subsystem.

If the memory subsystem receives a request for a copy of the memory block from a second processor, the memory controller compares the value in the owner/sharer field with the value in the writer field to determine who is the owner of the block and thus which entity is responsible for supplying the most up-to-date copy. If the two values match, memory considers itself to be the owner of the block, and can service the request from main memory, regardless of whether the two matching values identify some entity other than main memory. If the two values do not match, the memory controller concludes that the entity whose ID is stored in the owner/sharer field is the owner, and that this entity has the most up-to-date copy. In this case, the memory controller forwards the request to the identified owner for servicing. When the first processor is done updating the memory block, it simply writes the updated data back into the home memory subsystem and enters its ID in the writer field of the directory's write-back region. Significantly, as part of the write-back operation of the present invention, the first processor neither reads nor modifies the owner/sharer field of the respective directory entry.

If the memory subsystem receives a new request for the memory block, it again compares the value in the owner/sharer field with the value in the writer field. If the values are the same, e.g., they both contain the identifier associated with the first processor, then the memory controller concludes that the first processor has written the block back to memory and that the most up-to-date version of the memory block is once again in the memory subsystem. In this case, the memory controller itself forwards a copy of the block from memory to the requesting entity.

BRIEF DESCRIPTION OF THE DRAWINGS

The invention description below refers to the accompanying drawings, of which:

FIG. 7 is a highly schematic block diagram of the directory of the present invention.

DETAILED DESCRIPTION OF AN ILLUSTRATIVE EMBODIMENT

Figure 1:
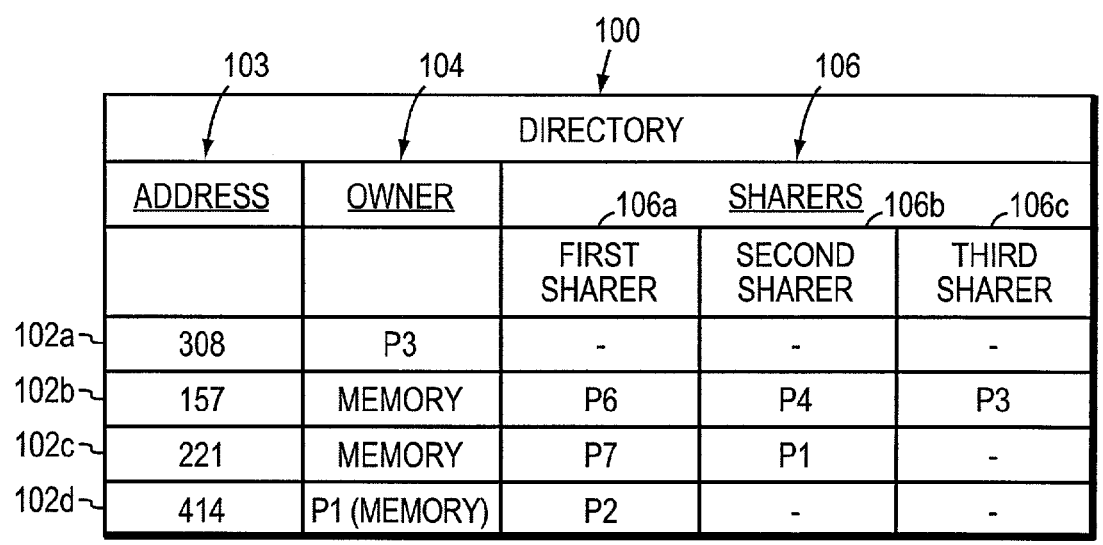
FIG. 1, previously discussed, is a highly schematic diagram of a conventional directory.
Figure 2:
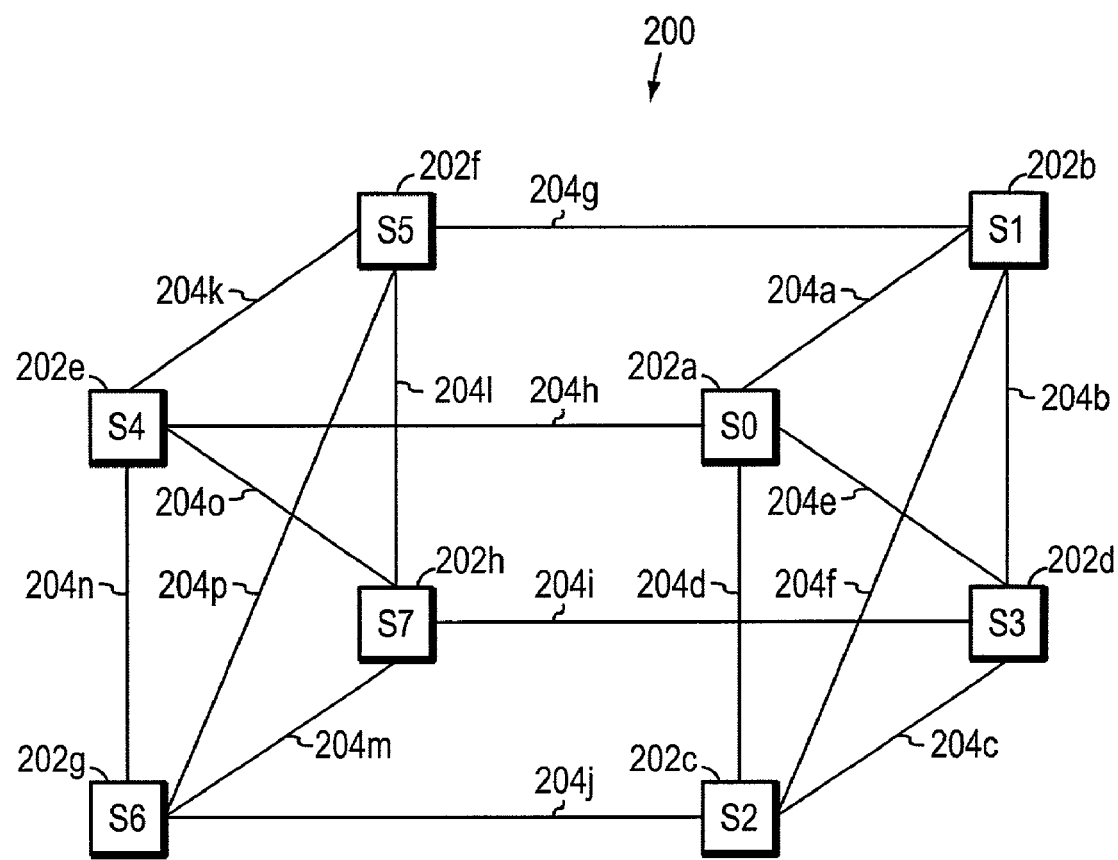
FIG. 2 is a highly schematic functional block diagram of a multi-processor node.

FIG. 2 is a highly schematic illustration of a preferred multiprocessor node 200 for use with the present invention. The node 200 comprises a plurality of, e.g., eight, sockets, S0–S7, which are designated by reference numerals 202a–h. The eight sockets 202a–h are logically located at the corners of a cube, and are interconnected by a plurality of inter-processor links 204a–p. Thus, each socket can communicate with any other socket of the node 200. In the illustrative embodiment, sockets forming two opposing sides of the node 200 are fully interconnected, while the two sides are connected only along the edges of the cube. That is, sockets S0–S3, which form one side of the cube, and S4–S7, which form the opposing side of the cube, are fully interconnected with each other, while the two opposing sides are connected by four inter-socket links 204g–j. As described herein, each socket includes one or more processors and has or is coupled to two main memory subsystems.

Figure 3:
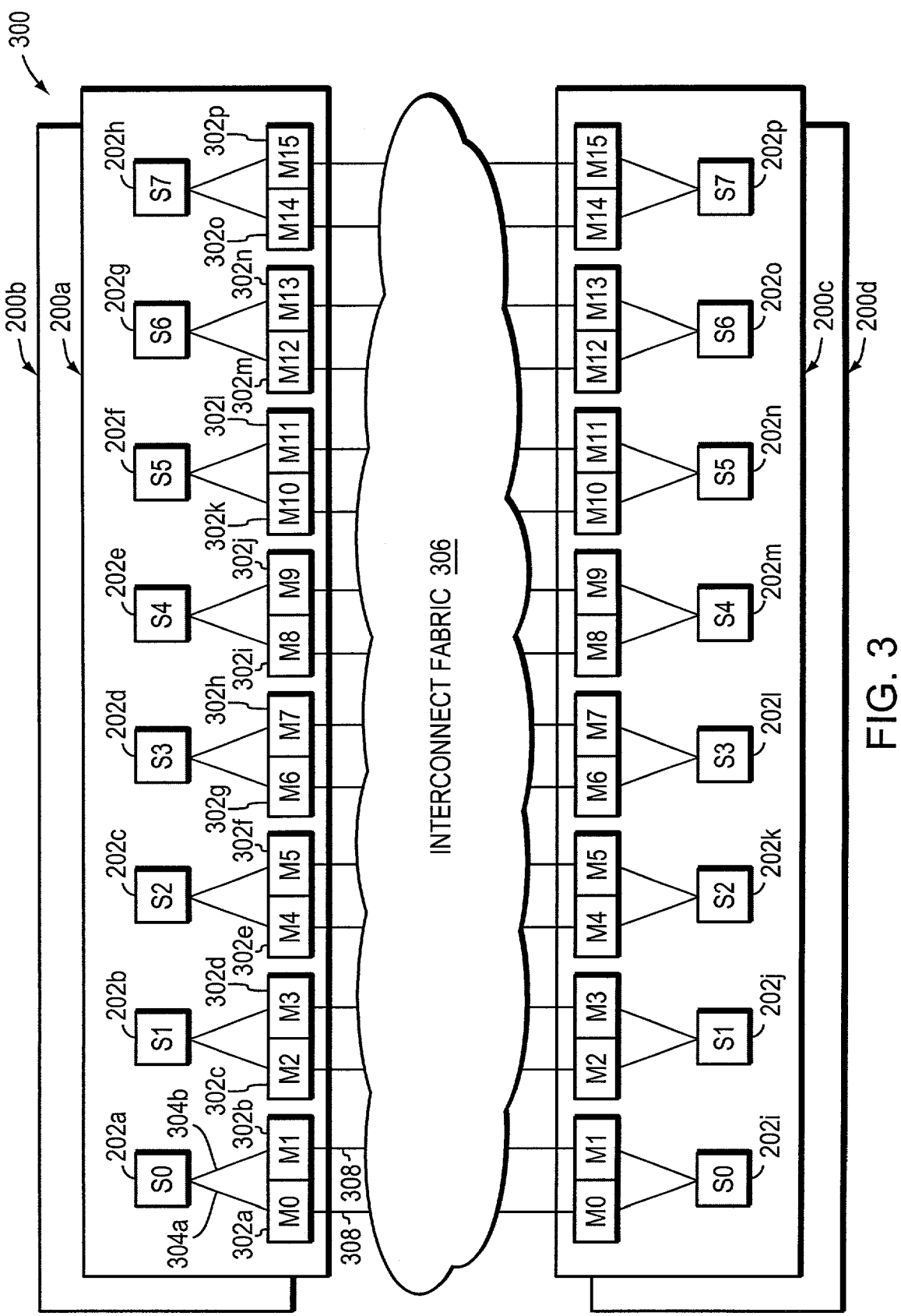
FIG. 3 is a highly schematic functional block diagram of a symmetrical multiprocessor (SMP) computer system formed from a plurality of multi-processor nodes.

FIG. 3 is a highly schematic illustration of a symmetrical multiprocessing (SMP) computer system 300 from a plurality of nodes. In particular system 300 comprises four nodes 200a–d, each of which corresponds to node 200 (FIG. 2). The inter-processor links have been omitted for clarity. As described above, each node, such as nodes 200a and 200c, has eight sockets, such as sockets 202a–h and 202i–p, respectively. Each node also includes a plurality of main memory subsystems (M0–M15). In the preferred embodiment, each node has sixteen memory subsystems, two for each socket. The sixteen memory subsystems M0–M15 of node 200a are designated by reference numerals 302a–p. Each socket is coupled to a pair of memory subsystems by a corresponding pair of processor/memory links. Socket 202a, for example, is coupled to memory subsystems 302a and 302b by processor/memory links 304a and 304b, respectively.

The four nodes 200a–d, moreover, are fully interconnected with each other through an interconnect fabric 306. Specifically each memory subsystem, such as subsystems 302a and 302b, are connected to the interconnect fabric 306 by fabric links 308. In the preferred embodiment, each memory subsystem at a given node is coupled to its corresponding memory subsystem at the other three nodes. That is, memory subsystem M0 at node 200a is coupled by four fabric links to the M0 memory subsystem at the three other nodes 202b–d, memory subsystem M1 at node 200a is coupled by four fabric links to the M1 memory subsystem at the other three nodes 202b–d, and so on.

Figure 4:
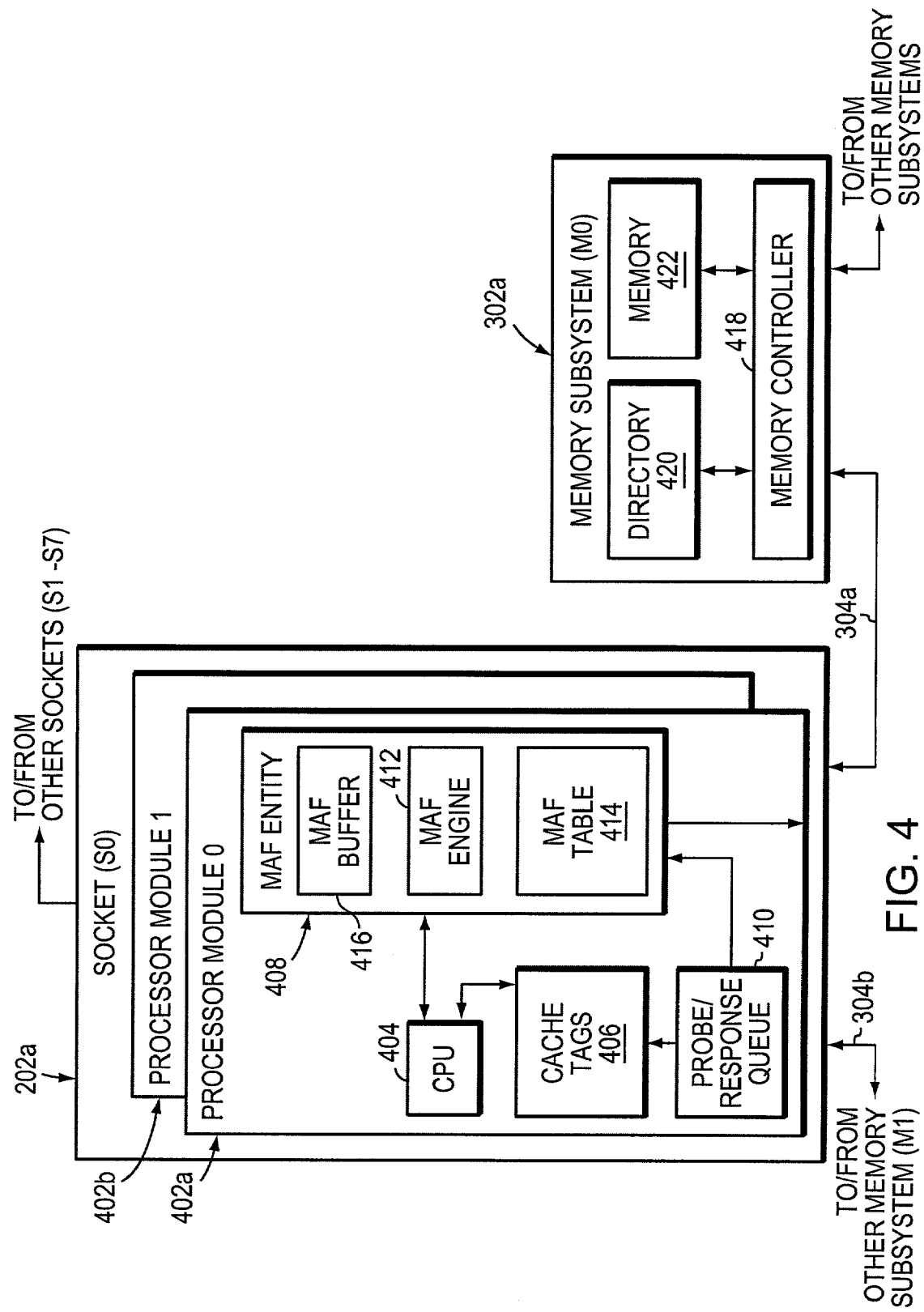
FIG. 4 is a highly schematic block diagram of a processor socket and memory subsystem of the SMP computer system of FIG. 3.

FIG. 4 is a highly schematic illustration of socket (S0) 202a, and one of its associated memory subsystems (M0) 302a. Socket 202a includes two processor modules 402a and 402b. Each processor module, such as module 402a, has a processor or central processing unit (CPU) 404, a cache tags storage device 406, a miss address file (MAF) entity 408 and a probe/response queue 410. The CPU 404 includes one or more processor caches (not shown) at one or more levels that are in close proximity to the CPU for storing data that the CPU 404 is currently using or is likely to use in the near future. Information regarding the status of the data stored in the processor cache(s), such as the address and validity of that data, is maintained in the cache tags storage device 406. The MAF entity 408, which keeps track of commands, such as memory reference requests, issued to the system, has a MAF engine 412 and a MAF table 414. MAF entity 408 may also include one or more buffers, such as MAF buffer 416.

Processor module 402b similarly includes a CPU, a cache tags storage device, a MAF entity and a probe/response queue. Socket (S0) 202a is coupled to the other sockets (S1–S7) of node 200a by inter-socket links and to memory subsystems (M0) 302a and (M1) 302b by processor/memory links 304a and 304b, respectively.

It should be understood that each processor module 402 may also include other components, such as a write back or victim buffer, a register file, a translation look-aside buffer (TLB), load/store (L/S) queues, etc.

The memory subsystem (M0) 302a has a memory controller 418, a directory 420 and one or more memory modules or banks, such as memory unit 422. Memory unit 422 may be and/or may include one or more conventional or commercially available dynamic random access memory (DRAM), synchronous DRAM (SDRAM), double data rate SDRAM (DDR-SDRAM) or Rambus DRAM (RDRAM) memory devices.

It should also be understood that each socket 202 may further include one or more input/output (I/O) subsystems (not shown), such as an I/O bridge, that connects one or more I/O devices or peripherals to the SMP system 300. The I/O subsystems, moreover, may have their own private caches for buffering data, and the I/O devices may be granted access to some or all of the SMP system's main memory through the I/O subsystems.

The memory subsystems of nodes 200a–d combine to form the main memory of is the SMP system 300 some or all of which may be shared among the processors. Each socket 202, moreover, includes a portion of main memory by virtue of its respective memory subsystems 302. Data stored at the memories 422 of each subsystem 302, moreover, is organized into separately addressable memory blocks that are equivalent in size to the amount of data stored in a processor cache line. The memory blocks or cache lines are of uniform, fixed size, and represent the smallest unit of data that can be moved around the SMP system 300. In the preferred embodiment, each cache line contains 128-bytes of data, although other fixed sizes, such as 64-bytes, could be utilized. Each memory address, moreover, maps to and thus identifies one and only one memory block. And, a plurality of address bits, such as the upper three address bits, are preferably employed to identify the "home" memory subsystem of the respective memory block. That is, each memory block, which is separately addressable by the SMP system 300, has a pre-determined home memory subsystem that does not change. Each directory, moreover, maintains status information for the cache lines for which its memory subsystem is the home memory. In other words, rather than having a single, centralized directory, the "directory" for the SMP system 300 is distributed across all of the memory subsystems.

CPU 404 may be and/or include any one of the processors from the Itanium architecture from Intel Corp. of Santa Clara, Calif., such as the Itanium® 1 or Itanium® 2 processors. Nonetheless, those skilled in the art will understand that other processors, such as the Hammer series of 64-bit processors from Advanced Micro Devices, Inc. (AMD) of Sunnyvale, Calif., may also be used.

The processors 404 and memory subsystems 302 interact with each other by sending "command packets" or simply "commands" to each other. Commands may be classified generally into three types: Requests, Probes and Responses. Requests are commands that are issued by a processor when, as a result of executing a load or store operation, it to must obtain a copy of data. Requests are also used to gain exclusive ownership or write access to a piece of data, e.g., a memory block. Requests include Read commands, Read_Modify (ReadMod) commands, Change_to_Dirty (CTD) commands, and Write_Back (WB) commands, among others. Probes are commands issued to one or more processors requesting data and/or cache tag status updates. Probe commands include Forwarded_Read (FRead) commands, Forwarded_Read_Modify (FReadMod) commands, and Invalidate (Inval) commands, among others. Responses are commands which carry requested data to a processor or acknowledge some request. For Read and ReadMod commands, the responses are Fill and Fill_Modify (FillMod) commands, respectively. For CTD commands, the responses are CTD_Success or CTD_Failure commands. For WB commands, the response may be a WB_Acknowledgement command.

Figure 5:
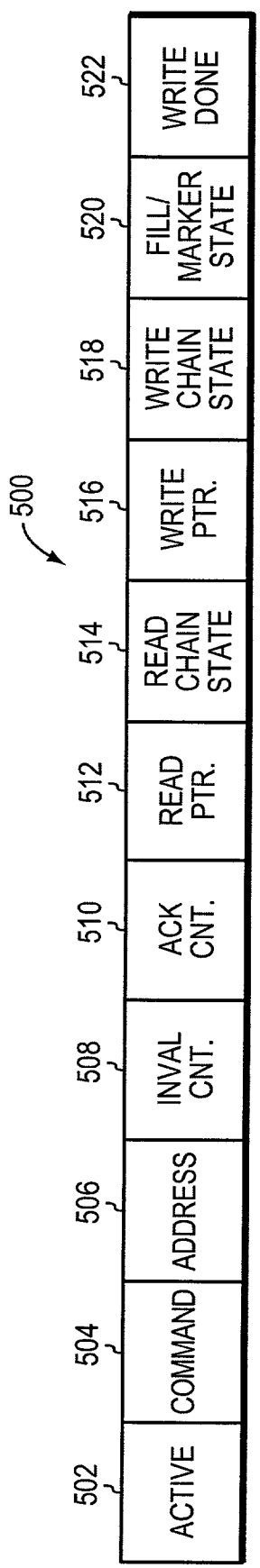
FIG. 5 is a highly schematic block diagram of a miss address file (MAF) entry.

The MAF table 414 is organized at least logically as a table or array having a plurality of rows and columns whose intersections define cells for storing information. FIG. 5 is a highly schematic block diagram of an exemplary row or entry 500 of MAF table 414 (FIG. 4). Entry 500 has a plurality of fields including a 1-bit active field or flag 502, which indicates whether the respective entry 500 is active or inactive, i.e., whether the outstanding request represented by entry 500 is complete or not. A request that is not yet complete is considered active. Entry 500 further includes a command field 504 that specifies the particular command that is outstanding, and an address field 506 that specifies the memory address corresponding to the command. Entry 500 additionally includes an invalid count (Inval Cnt.) field 508, an acknowledgement count (Ack Cnt.) field 510, a read pointer (ptr.) field 512, a read chain field 514, a write pointer field 516, a write chain field 518, a fill/marker state field 520 and a write-done field 522.

MAF engine 412, among other things, operates one or more state machines for each entry of the MAF table 414. Specifically, the read chain field 514, the write chain field 518 and the fill/marker field 520 each store a current state associated with the entry. In the illustrative embodiment, a MAF entry transitions between two fill/marker states: idle and active, and the current fill/marker state is recorded at field 520.

Figure 6:
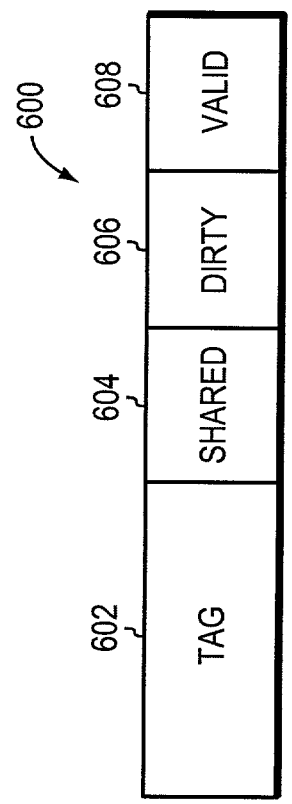
FIG. 6 is a highly schematic block diagram of a cache tag entry.

The cache tags storage device 406 (FIG. 4) is also organized at least logically as a table or array having a plurality of rows and columns whose intersections define cells for storing information. FIG. 6 is a highly schematic block diagram of an exemplary row or entry 600 of the cache tags storage device 406. As mentioned above, each entry of the cache tags storage device 406, including entry 600, corresponds to a particular cache line stored at the processor's cache(s). Cache tag entry 600 includes a tag field 602 that specifies the memory address of the respective cache line, and a series of status flags or fields, including a shared flag 604, a dirty flag 606 and a valid flag 608. The valid flag 608 or bit indicates whether the respective cache line has a copy of valid data in it, i.e., whether the data is coherent with the latest version of the block. The shared flag 606 or bit indicates whether more than one processor cache in the SMP system has a copy of the block. The dirty flag 608 or bit indicates whether the cache line has been modified or changed by the processor and is thus more up-to-date than the version stored at main memory. When a processor writes to a cache line, it sets the dirty flag 608 to indicate that this version of the block is now the latest version.

In the illustrative embodiment, the processors and memory subsystems of the SMP 300 system cooperate to execute a write-invalidate, ownership-based cache coherency protocol. "Write-invalidate" implies that when a processor wishes to modify a cache line, it causes copies of the cache line that may be located in other processors' caches to be invalidated, rather than updating them with the new value. "Ownership-based" implies there is always an identifiable owner for a cache line, whether it is memory or one of the processors of the SMP system 300. The owner of a cache line, moreover, is responsible for supplying the most up-to-date value upon request. A processor may own a cache line "exclusively" or "shared". If a processor has exclusive ownership over a cache line, it may modify or update the cache line without informing the system. Otherwise, it must inform the system and potentially invalidate copies located in other processors' caches.

Directory 420 is similarly organized at least logically as a table or array having a plurality of rows and columns whose intersections define cells for storing information. FIG. 7 is a highly schematic block diagram of directory 420. In accordance with the present invention, directory 420 is organized into two regions or areas, a main directory region 702 and a write-back directory region 704. A plurality of rows 706–710 span both regions 702 and 704 of the directory 420. Several versions of row 706, which are described below, are shown. Within each region 702 and 704, a plurality of columns are defined for specifying the type of information stored in the directory's entries. The main directory region 702, for example, has an owner/sharer column 714 for storing the identifier (ID) assigned to the entity that owns the cache line, and a sharer list column 716 for indicating which entities, if any, have a shared copy of the cache line.

The sharer list column 716 is preferably configured to operate in one of two different modes. In a first mode, sharer list column 716 is organized into two sharer columns 716a and 716b each of which can store the identifier (ID) assigned to a single entity, such as a processor, of the SMP system 300 that has a shared copy of the respective cache line. If a third entity is to be added as a sharer, the sharer list column 716 converts from two sharer columns 716a and 716b to a single coarse sharer vector column 716c. Each bit of the sharer vector column 716c corresponds to and thus identifies a set of one or more sockets 202 of system 300. If a bit is asserted, then at least one processor located within the set of sockets associated with the asserted bit has a copy of the respective cache line. Entries 707 and 709 illustrate the first mode, and entries 708 and 710 illustrate the second mode. Main region 702 further includes an unused column 718 and an error correction code (ECC) column 720 for storing an ECC value calculated for the data in fields 714–718.

The write-back region 704 has a writer column 722, an unused column 724 and an ECC column 726. As explained herein, the contents of the owner/sharer column 714 of the main region 702 together with the contents of the writer column 722 of the write-back region 704 determine who owns the respective cache line and thus where the most up-to-date version is located within the SMP system 300. The ECC column 726 stores an ECC value calculated for the data in fields 722 and 724.

The unused fields 718 and 724 are provided in order to support modifications to the protocol and/or increases in the size of the address or other fields. It should be understood that one or more bits of unused column 714 may be used to signify whether the corresponding entry's sharer list 716 is in individual sharer mode, i.e., fields 716a and 716b, or in coarse sharer vector mode, i.e., sharer vector field 716c.

In the preferred embodiment, directory 420 is actually located within the memory unit 422 itself along with the memory blocks, and is not a separate memory component. That is, each memory address indexes to an area of the memory device 422 that is preferably divided into three regions. The first region corresponds to the main directory region for the block specified by the memory address. The second region corresponds to the write-back region for the memory block, and the third region corresponds to the data contents of the memory block.

In the illustrative embodiment, the owner/sharer field 714 is 10-bits, the sharer list field 716 is 16-bits, thereby supporting either two 8-bit sharer IDs or one 16-bit coarse sharer vector, and the unused and ECC fields 718 and 720 are each 7-bits. The main directory region 702 of a memory area is thus 5-bytes. For the write-back region 704, the writer field is 9-bits, the unused field is 1-bit and the ECC field is 6-bits, thereby making the write-back region 2-bytes. The third region includes the cache line, which may be 128-bytes, and a 9-byte ECC field (not shown) for a total of 137-bytes. The ECC field associated with the cache line contains an ECC value computed for the cache line itself. Accordingly, for each cache line, the memory area comprises 144-bytes of information in total.

As mentioned above, each CPU 404 of the SMP system 300 may access portions of memory stored at the two memory subsystems 302 coupled to its socket, i.e., a "local" memory access, or at the memory subsystems coupled to any other socket of the SMP system 300, i.e., a "remote" memory access. Because the latency of a local memory access will differ from the latency of a remote memory access, the SMP system 500 is said to have a non-uniform memory access (NUMA) architecture. Further, since the system 300 provides coherent caches, the system is often called a cache-coherent NUMA (CC-NUMA) system. In the illustrative embodiment of the invention, the SMP system 300 is preferably referred to as a distributed shared memory system, although it may also be considered equivalent to the above classes of systems.

Virtual Channels

As indicated above, memory reference operations, such as reads, from a processor are preferably executed by the SMP system 300 through a series of steps where each step involves the exchange of a particular command among the processors and shared memory subsystems. The cache coherency protocol of the present invention avoids deadlock through the creation of a plurality of channels. Preferably, the channels share physical resources and are thus "virtual" channels. Each virtual channel, moreover, is assigned a specific priority relative to the other virtual channels so that, by appropriately assigning the different types of commands to different virtual channels, the SMP system 300 can also eliminate flow dependence. In general, commands corresponding to later steps in a given series are assigned to higher priority virtual channels than the commands corresponding to earlier steps.

In the illustrative embodiment, the SMP system 300 maps commands into at least three (3) virtual channels that are preferably implemented through the use of queues. A Q0 channel carries processor command request packets for memory space read and write transactions. A Q1 channel accommodates command probe packets directed responsive to Q0 requests. A Q2 channel carries command response packets that are responsive to Q0 requests.

A suitable mechanism for implementing virtual channels in a large SMP system is described in U.S. Pat. No. 6,014,690, issued Jan. 11, 2000 for EMPLOYING MULTIPLE CHANNELS FOR DEADLOCK AVOIDANCE IN A CACHE COHERENCY PROTOCOL, which is hereby incorporated by reference in its entirety.

Those skilled in the art will recognize that other and/or additional virtual channels could be defined. The virtual channels, moreover, can be configured to carry other types of command packets. The Q0 virtual channel, for example, may also accommodate processor command request packets for programmed input/output (PIO) read and write transactions, including control status register (CSR) transactions, to input/output (I/O) address space.

Operation of the Distributed Directory

Each memory subsystem preferably includes a built-in, self test (BIST) engine (not shown) that is used during initialization of the subsystem. The BIST engine initializes the contents of the memory device 422, including the directory contents and ECC values, by setting them to predetermined values as one of the final steps of the self test. It should be understood that firmware, rather than or in addition to a BIST engine, may be used for initialization purposes.

As data is brought into the SMP system 300, it is loaded into the memory devices 422 of the memory subsystems 302 in units of memory blocks or cache lines. As each memory block is stored at a memory subsystem 302, the memory controller 418 computes a first error correction code (ECC) value for the block which is stored along with the cache line as described above. Data may be brought into the memory subsystems 302 from any number of sources, such as floppy disk drives, hard disk drives, tape drives, optical or magneto-optical drives, scanners, sound cards, etc. The memory controller 418 also loads the owner/sharer field 714 in the main region 702 and the writer field 722 in the write-back region 704 with the same value, namely, the identifier (ID) assigned to the home memory system. The remaining fields of each entry are preferably de-asserted and/or set to null, e.g., to zero. The memory controller 418 also computes a second ECC value for the information in the main directory region 702, and a third ECC value for the information in the write-back region 704. The second ECC value is stored in ECC field 720 while the third ECC value is stored in ECC field 726. Entry 706a illustrates how a directory entry would appear upon initialization of the memory subsystem.

Read Command

Suppose a processor, e.g., processor P0, of the SMP system 300 wishes to read a cache line that is not present in its cache. Processor P0 preferably issues a Read command on the Q0 virtual channel specifying the address of the desired cache line. Processor P0 also directs MAF entity 416 to create an entry in the MAF table 414 for this request. MAF entity 416 asserts the active flag 502, loads the command field 504 with an operation code (opcode) indicating that the outstanding request is a Read command and enters the address of the cache line in the address field 506. MAF engine 412 transitions the Fill/Marker state associated with the entry and reflected in field 520 from the idle state to the active state. The remaining fields of the MAF table entry 500 may be deasserted. The SMP system 300 routes the Read command from processor P0 to the home memory subsystem for the specified cache line, e.g., subsystem 302a.

At memory subsystem 302a, the memory controller 418 accesses the area of memory device 422 specified by the address contained in the Read command, and retrieves the directory entry, e.g., entry 706a, for the cache line. The memory controller 418 first examines the information stored in the owner/sharer field 714 and the writer field 722 of the identified entry 706a. Because the contents of both the owner/sharer field 714 from the main region 702, and the writer field 722 from the write-back region 704 are the same, i.e., memory, the memory controller 418 concludes that it is the owner of the cache line, and that the version stored at its memory device 422 is the most up-to-date. Accordingly, the memory controller 418 responds to the Read command by sending processor P0 a copy of the cache line from memory device 422.

Specifically, the memory controller 418 issues a Fill command on the Q2 virtual channel that includes the address and data of the requested cache line. The memory controller 418 also adds P0's identifier (ID) to the list of sharers maintained in the sharer column 716. Assuming P0 is the first entity to request a shared copy of the cache line, memory controller 418 enters P0's ID into sharer field 716a. As P0 has only requested a shared copy of the cache line, the memory controller 418 does not modify the contents of the owner/sharer field 712. The memory controller 418 also does not modify the contents of the writer field 722. Entry 706b (FIG. 7) illustrates how entry 706a would appear following the updates performed by the memory controller 418 in response to the Read command from P0.

It should be understood that, when a memory block is read out of a memory device 422, the memory controller 418 preferably checks parity information, e.g., a parity bit, to determine whether the retrieved data has been corrupted. If so, the memory controller 418 utilizes the previously computed ECC value to recover the data. The recovered data is then sent to the requesting entity. The recovered data may also be loaded back into the memory device 422, overwriting the corrupted data. Controller 418 also checks a parity bit when reading information from the main directory region 702. And, if the information in the main directory region 702 is updated, such as by adding P0 to the sharer list 716, the memory controller 418 computes a new ECC value and stores it in ECC field 720.

In some SMP systems that use ordered Q1 commands, a fill marker mechanism is employed to inform a processor that its request, such as a Read command, has accessed is the home memory's directory, and that the requested data is in the process of being returned to the processor. Typically, the fill marker mechanism is implemented through the issuance of a separate Marker command by the memory subsystem to the processor upon access to the directory. In the illustrative embodiment, memory controller 418 does not send a separate Marker command message in response to Read commands. Nonetheless, those skilled in the art will recognize that a fill maker mechanism could be implemented by SMP system 300.

At processor P0, the Fill command is received at the probe/response queue 410, and the MAF engine 412 searches the MAF table 414 for an entry corresponding to the address contained in the received Fill command. The MAF engine 412 transitions the state reflected in the Fill/Marker state field 520 from the active state to the idle state, and the matching entry is rendered inactive by de-asserting the active flag 502. The data included with the Fill command is loaded into P0's cache and the respective entry 600 of the cache tags storage device 406 is up-dated. Specifically, the tag field 602 is loaded with the address of the received cache line, the shared and valid flags 604 and 608 are asserted and the dirty flag 606 is de-asserted.

ReadMod Command

Suppose that, instead of wanting just read access to a cache line, processor P0 wishes to obtain write access over a cache line that is not present in its cache.

In this case, processor P0 preferably issues a Read_Modify (ReadMod) command on the Q0 virtual channel specifying the address of the desired cache line. Processor P0 also directs MAF entity 416 to establish an entry in the MAF table 414 for the outstanding ReadMod command. MAF entity 416 asserts the active flag 502, loads the command field 504 with an opcode indicative of a ReadMod command, and enters the address of the cache line in the address field 506. In addition, MAF entity 416 transitions the Fill/Marker state as reflected in field 520 from the idle state to the active state. The remaining fields of the MAF table entry 500 may be de-asserted. System 300 routes the ReadMod command from processor P0 to the cache line's home memory subsystem 302*a*.

At memory subsystem 302*a*, the memory controller 418 accesses the area specified by the address of the ReadMod command, and retrieves the corresponding directory entry, i.e., entry 706*a*. The memory controller 418 first examines the information stored in the owner/sharer field 714 and the writer field 722 of the identified entry 706*a*. Because the contents of both the owner/sharer field 714 and the writer field 722 are the same, i.e., they both indicate memory, the memory controller 418 concludes that it is the owner of the cache line, and that the version stored at its memory 422 is the most up-to-date. The memory controller 418 also checks the sharer column 712 to see whether any other entities have a shared copy of the requested cache line. In this case, no entities have a shared copy of the cache line. Accordingly, the memory controller 418 responds to the ReadMod command by sending processor P0 a copy of the cache line from its memory device 422.

Specifically, the memory controller 418 issues a Fill_Modify (FillMod) command on the Q2 virtual channel that includes the address and data of the requested cache line. Because P0 is requesting write access to the cache line, the memory controller 418 inserts P0's identifier (ID) into the entry's owner/sharer field 714 replacing the current value, i.e., memory. Nonetheless, the memory controller 418 does not modify the contents of the entry's writer field 722. Entry 706*c* (FIG. 7) illustrates how entry 706*a* would appear following the updates performed by the memory controller 418 in response to the ReadMod command from P0.

If, at the time the ReadMod command is received at the memory controller 418, the sharer column 712 of entry 706*a* indicated that one or more entities have a shared copy of the cache line, the memory controller 418 would issue an Invalidate (Inval) command on the Q1 virtual channel to each such entity directing them to invalidate their copies of the cache line. Supposing there were two such entities, the memory controller 418 would have also set an invalid count within the FillMod command to two. When the FillMod command is received at P0, the corresponding MAF entry is located and the Inval Count field 508 is set to two as specified by the FillMod command.

In response to the Inval commands from the memory controller 418, the other entities invalidate their copies of the cache line and send Invalid_Acknowledgement (IAck) commands on the Q2 virtual channel to P0. In response to each IAck command, P0 increments by one the Ack Count field 510 of the respective MAF entry 500. The MAF engine 412 continuously checks the values of the Inval Count and Ack Count fields 508 and 510. When the two values are the same, indicating that each and every entity that had a shared copy of the cache line has invalidated its copy, P0 considers the cache line to be consistent and available to it for processing.

Suppose, after granting P0 write access over the cache line, another processor, e.g., processor P1, issues a Read command for the cache line. The Read command is routed by the SMP system 300 to memory subsystem 302*a* which is the cache line's home memory. The memory controller 418 locates the directory entry, i.e., entry 706*c*, corresponding to this cache line and examines the information stored in the owner/sharer field 714 and the writer field 722 of the identified entry 706*a*. As the owner/sharer field 714 indicates P0 and the writer field 722 indicates memory, the two values are not the same. In this case, the memory controller 418 concludes that the entity specified in the owner/sharer field 714, i.e., P0, rather than the memory subsystem itself, is the owner and has the most up-to-date version of the cache line. Accordingly, the memory controller 418 issues a Forwarded_Read (FRead) command on the Q1 virtual channel to P0. The memory controller 418 updates the sharer list column 716 for this directory entry to reflect that processor P1 has a shared copy of the cache line. The memory controller 418 does not, however, modify either the owner/sharer field 714 or the writer field 722. Entry 706*d* (FIG. 7) illustrates how entry 706*c* would appear following the updates performed by the memory controller 418 in response to the Read from P1.

P0 responds to the FRead by sending a copy of the cache line from its cache to P1 on the Q2 virtual channel.

ReadMod Command with other Processor as Owner

Suppose a third processor, P2, now issues a ReadMod command for this same cache line. The ReadMod is routed by the SMP system 300 from processor P2 to memory subsystem 302*a* which is the home memory for this cache line. The memory controller 418 accesses the area of memory device 422, and retrieves the directory entry, i.e., entry 706*d*, corresponding to this cache line. Controller 418 then examines the information stored in the owner/sharer field 714 and the writer field 722 of the identified entry 706*d*. As the two values are not the same, the memory controller 418 concludes that P0, rather than the memory subsystem itself, is the owner and thus has the most up-to-date version of the cache line. Memory controller 418 also examines the sharer list column 716 and determines that P1 has a shared copy of the cache line. In this case, the memory controller 418 issues a Forwarded_Read_Modify (FReadMod) command on the Q1 channel to P0, and an Inval command on the Q1 channel to P1. In the illustrative embodiment, the FReadMod command also carries an inval count of two. The memory controller 418 also updates the directory entry to reflect that P2 is now the owner/sharer of the cache line and that there are no sharers. The memory controller 418 does not modify the writer field 722. Entry 706e (FIG. 7) illustrates how entry 706d would appear following the updates performed by the memory controller 418 in response to the ReadMod command from P1.

In response to the FReadMod command, P0 issues a FillMod command on the Q2 virtual channel to P2 containing the cache line. The FillMod command preferably has an Inval Count of two, reflecting that there are two entities with a copy of the cache line, i.e., P0 and P1. P0 also invalidates its copy of the cache line by de-asserting the cache tag entry's valid flag 608, and sends P2, either individually or as part of the FillMod command, an IAck command on the Q2 channel. In response to the Inval command, P1 also invalidates its copy of the cache line and sends an IAck command to P1. As each IAck command is received at P1, its MAF engine 412 increments the Ack Count field 510 of the corresponding MAF entry 500 by one. When the Inval Count and Ack Count fields 508 and 510 are equal, the cache line is considered to be consistent and may be processed, e.g., read and/or modified, by P2.

Write Back Command

When P2 is finished with the cache line, it writes the cache line back to memory subsystem 302a in order to make room in its cache for other cache lines. In the illustrative embodiment, the processor module 402a (FIG. 4) does not include a separate write-back or victim buffer. Instead, a cache line that is being victimized from the processor's cache is written-back to memory directly from the cache. With the prior art solutions, writing a cache line back to memory required an atomic read-modify-write cycle to be performed by the processor. Such read-modify-write cycles require significant time to complete and consume substantial system resources, including bandwidth. They also divert the processor from performing other, possibly more important, tasks. With the present invention, write-backs are performed without having to impose atomic read-modify-write cycles on the computer system.

When a processor, such as P2, wishes to write-back a cache line over which it has write access, it first checks the corresponding tag entry 600. Specifically, P2 confirms that the dirty flag 606 and the valid flag 608 are both asserted, thereby indicating that P2 is the owner of the cache line to be written back and that the cache line is still valid. Only those memory blocks that were acquired by a processor with a request for exclusive or write access may subsequently be written back to main memory. If the dirty flag 606 is not asserted and/or the cache line is invalid, P2 is precluded from writing the cache line back to memory. P2 also checks its MAF table 414 to see if a MAF entry 500 already exists for the cache line to be written back. If there is a MAF entry 500, P2 confirms that the entry is inactive, that there are no outstanding IAcks for the cache line, i.e., that the Inval Count field 508 equals the Ack Count field 510, that the read pointer and write pointer fields 512 and 516 are both invalid, and that the fill/marker state field 520 is set to the idle state. If there are one or more outstanding IAcks or the MAF entry is active, the processor is precluded from writing the cache line back to memory.

Assuming the cache line is valid and dirty, and that MAF entry satisfies the above checks, a processor, such as P2, simply issues a Write_Back (WB) command to main memory. The WB command, which includes the cache line and its address, is preferably issued on the Q0 virtual channel. The tag entry 600 may then be invalidated and the entry made available to store a new cache line. No copy of the cache line being written back is kept at processor P2 upon issuance of the WB command. In the preferred embodiment, the processor P2 also creates a new entry 500 in the MAF table 414 for the WB command. The processor P2 asserts the active field 502, enters an opcode associated with the WB command into the command field 504 and enters the cache line's address into the address field 506.

The WB command is routed by the SMP system 300 to memory subsystem 302a, which is the cache line's home memory. At the memory subsystem 302a, the memory controller 418 responds to the WB command by storing the modified data appended to the WB command in memory device 422 overwriting the previous data contents of the memory block. The memory controller 418 also updates the directory entry's write-back region 704. Specifically, the writer field 722 of the directory entry, i.e., entry 706e, corresponding to the cache line that is being written back is updated with the ID of the processor that issued the WB command, i.e., processor P2. Significantly, neither the memory controller 418 nor the processor make any change to the entry's owner/sharer field 714. Entry 706f (FIG. 7) illustrates how entry 706e would appear following the write-back operation by P2.

In addition to storing the modified data at the memory device 422, the memory controller 418 preferably computes a new ECC value for the data and stores this new ECC value along with the cache line. Furthermore, because it has changed the contents of the write-back region 704, the memory controller 418 also computes a new ECC value for the information in region 704 and stores this new value in the ECC field 726.

As shown, to perform a write-back, processor P2 does not read the contents of the owner/sharer field 714 to determine whether or not it can even proceed with the write back. Furthermore, as part of the write-back operation of the present invention, no modification is made to the owner/sharer field 714. Instead, the only field that is modified is the writer field 722, which is part of the new write-back directory region 704. After updating the entry's writer field 722, the memory controller 418 returns an Acknowledgement (ACK) command to P2. The ACK is preferably issued on the Q2 virtual channel, although it may alternatively be issued on the Q1 virtual channel. In response to receiving the Ack command, P2 causes the MAF entry 600 that was created for the WB command to be deactivated, e.g., by de-asserting the active field 502.

As shown, with the present invention, modified data from a processor cache is written back to main memory in a simple and efficient manner.

Suppose that, following P2's write-back of the cache line, some other processor in the SMP system 300, e.g., processor P3, now issues a Read command for the cache line. As described above, the Read command is routed by the SMP system 300 to memory subsystem 302a, which is the home memory for the cache line. The memory controller 418 responds to the Read command by accessing the directory entry, i.e., entry 706f, that corresponds to the requested cache line. The memory controller 418 compares the contents of the owner/sharer field 714 with the contents of the writer field 722 from the directory's write-back region 704. Because the WB command from P2 modified the writer field 722 but not the owner/sharer field 714, the values in the two fields are now the same, i.e., they both contain P2's ID. As the values stored in the two fields 714, 722 are the same, the memory controller 418 concludes that it is the owner of the requested cache line, and that it has the most up-to-date version in its memory 422. Controller 418 reaches this conclusion even though the owner/sharer field 714 does not indicate memory as the owner of the cache line. Because the two fields 714, 722 contain the same value, the memory controller 418 responds to the Read command from processor P3 by issuing a Fill command on the Q2 channel which includes a copy of the cache line taken from its memory device 422. The memory controller 418 also updates the directory entry by adding P3 to the sharer list field 716. The memory controller 418 does not modify either the owner/sharer field 714 or the writer field 722. Entry 706g (FIG. 7) illustrates how entry 706f would appear following the Read command from processor P3.

Except for the condition noted below, the writer field 722 of the directory's write-back region 704 is only modified in response to a WB command from a processor (or other system entity) performing a write-back of data to memory. The WB command, moreover, does not result in the contents of the owner/sharer field 714 being read or modified. The memory controller 418, moreover, updates the contents of a directory entry immediately in response to the received command, e.g., Read command, ReadMod command, WB command, etc. Such updates are not dependent upon the memory controller 418 receiving additional information, such as Acks, from system entities.

Write-backs must be strictly serialized. That is, at any point in time, the cache coherency protocol ensures that only a single processor can issue a WB command for a given memory block. In the illustrative embodiment, this is accomplished by permitting only a single entity to have write or exclusive access to a given memory block. A second entity requesting write access over the given memory block is not granted such access until the previous owner has either been invalidated or has written the memory block back to main memory. Accordingly, at any given point in time, the cache coherency protocol permits only a single entity to issue a WB command for a given memory block.

It should be understood that other commands, in addition to those described above, may be utilized by the SMP system 300. For example, SMP system 300 may also support Invalidate to Dirty and/or Full Block Write commands.

Invalidate to Dirty

As indicated above, a memory block or cache line, which may be 128-bytes, is the minimum unit of information, e.g., data and/or instructions, that is moved about the SMP system 300. When an entity intends to write to something less than a full memory block, such as a quadword which is 32-bytes, it typically issues a ReadMod command, and in response receives the full memory block including the 32-bytes of interest. The entity then writes the new data to the identified quadword, leaving the remaining portions of the memory block unchanged. The entire memory block, including the modified quadword, can then be written back to main memory. If an entity, such as a processor or an I/O subsystem on behalf of a peripheral device, intends to write the entire contents of a memory block, e.g., in connection with a direct memory access (DMA) write transaction, it may issue an Invalidate_to_Dirty (I2D) command. Since the entity is writing to the entire memory block, it does not care what the current version of the memory block is.

When an I2D command is received at the block's home memory subsystem, the memory controller 418 retrieves the respective directory entry, and issues Invals to the owner and sharer(s), if any, thereby causing them to invalidate their copies of the block. The memory controller 418 also enters the ID assigned to the source of the I2D command in the entry's owner field, and returns a Success command to the source of the I2D command. The Success command specifies how many entities had a copy of the block in their caches. Upon invalidating their copies of the block, the owner and sharers, if any, issue IAcks to the entity that sourced the I2D command. Once the source has received the Success command and an IAck from each entity that had a copy of the block, it can write the new data to memory by appending the modified data to a WB command. The memory controller responds to the WB command with a WB_Ack command.

Full Block Write

A Full_Block_Write (FBW) command, like an I2D command, is typically utilized by an I/O subsystem when performing a DMA write transaction. However, unlike the I2D, which does not carry data, the FBW command carries the new memory block being written. At the home memory subsystem, the memory controller 418 retrieves the respective directory entry. The memory controller 418 issues Invals to the owner and sharer(s), if any, thereby causing them to invalidate their copies of the block. The memory controller 418 also enters the ID assigned to the source of the FBW command in the directory entry's owner and writer fields and stores the data in main memory. The block's previous owner and sharer(s), if any, respond to the Invals by invalidating their copies of the memory block and issuing IAcks to the source of the FBW command. The source collects the IAcks for consistency purposes.

As shown, the processors 404 and directories 426 cooperate to execute a generalized low occupancy cache coherency protocol. The protocol is "generalized" in that it can support processors that share memory blocks that are in the dirty state as well as processors that are precluded from sharing memory blocks that are in the dirty state. A dirty-shared processor responds to a snoop read, e.g., a FRead command, identifying a block in the dirty state by sending a copy of the block from its cache to the source of the snoop read. The dirty-shared processor does not, in response to the snoop read, write a copy of the block back to main memory. Accordingly, multiple processors may have a "dirty" copy of a memory block, although only one processor, the owner, can write the block back to main memory. Non-dirty shared processors do not support dirty blocks being held in more than one cache. In particular, if a non-dirty shared processor receives a snoop read identifying a block in the dirty state, the processor typically writes the block back to main memory, thereby requiring the source of snoop read to obtain a copy of the block from memory. Alternatively, the non-dirty shared processor may return the dirty block to main memory but also forward a copy of the block from its cache to the source of the snoop read. As described in co-pending application Ser. No. 10/263,741, filed Oct. 3, 2002 and titled COMPUTER SYSTEM SUPPORTING BOTH DIRTY-SHARED AND NON-DIRTY-SHARED DATA PROCESSING ENTITIES, which is hereby incorporated by reference in its entirety, the illustrative cache coherency protocol supports both types of processor.

The protocol is also considered a "low occupancy" protocol, because of the following attributes. First, each command only has to access the directory 426 once. Second, directory changes are deterministic based on the current directory state and the type of the received command. That is, the resulting state or form of a directory entry is solely a function of the current state or form of the entry and the received command. Third, the directory 426 neither creates nor requires any transient states or the return of acknowledgements in order to maintain coherency. Accordingly, once the directory 426 has updated the appropriate fields and issued the required commands, e.g., ReadMods, Invals, etc., it can immediately process another command for the same memory block even though the previous commands have yet to reach their targets.

In accordance with the preferred embodiment of the present invention, the virtual channels, i.e., the logic, fabric links, and other resources on which the virtual channels are built, must guarantee delivery of all commands within the SMP system 300. The cache coherency protocol assumes that all commands issued in connection with a memory reference operation will be received by their intended targets.

It should be understood that the separate write back region 704 of directory 720 is primarily for illustration purposes only. In other words, those skilled in the art will recognize that the writer field 722 may just as easily be included within the main directory region 702, thereby eliminating the need for a dedicated write-back region 704.

It should be further understood that rather than having two ECC fields 720 and 726, one in the main directory region 702 and one in the write-back region 704, a single ECC field could be provided for each directory entry. With this embodiment, any change to the contents of a directory entry causes a new ECC value to be computed and loaded into the single ECC field.

Victim Race Condition

Suppose that, immediately after issuing the WB command, processor P2 decides it wants a shared copy of the cache line. As with the examples described above, P2 issues a Read command on the Q0 virtual channel. As the Q0 virtual channel is unordered, it is possible that the Read command even though issued later could nonetheless arrive at the home memory subsystem, i.e., subsystem 302a, before the WB command. In this case, the directory entry would still look like entry 706e in which the owner/sharer field 714 indicates P2 and the writer field 722 indicates memory. As explained above, if the contents of the owner/sharer field 714 and the writer field 722 are dissimilar, the memory controller 418, in response to a Read command, concludes that the entity indicated by the owner/sharer field 714 is the owner and issues a FRead to that entity for servicing the Read request. In this example, the memory controller 418 would issue a FRead to processor P2. Because processor P2 has issued a WB command, however, it no longer has a copy of the cache line. Such a condition could cause an undesirable victim race condition within the SMP system 300.

To prevent the occurrence of such a victim race, the processors, such as P2, are preferably configured first to check their MAF tables 414 before issuing a Read command for a desired cache line. If the MAF table contains an entry 500 for the desired cache line indicating that the processor has issued a WB command that has yet to be acknowledged, as reflected by the active field 502 still being asserted and the command field 504 carrying the opcode for a WB command, then the processor preferably waits to issue the Read command until the MAF entry is rendered inactive. As described above, upon completion of a WB command, an Ack command is returned to the processor. The processor, in response to the Ack command, renders the corresponding MAF entry 500 inactive. By waiting to issue the Read command until after the MAF entry 500 becomes inactive, a processor, such as P2, ensures that its Read command can be filled by the memory subsystem 302a itself, thereby preventing the occurrence of a victim race condition.

In an alternative embodiment, the processors do not create a MAF entry upon issuing a WB command. In addition, no Acknowledgements are returned to the processors by the memory controllers upon completion of a WB command. With this embodiment, victim races are avoided through Retry commands. That is, if a memory subsystem receives a Read or ReadMod command from a source processor and the owner/sharer and writer fields 714, 722 both specify the source processor, thereby indicating that the source processor is still the owner of the requested cache line, the memory processor assumes there is a WB command in transit from the source processor. Accordingly, the memory subsystem responds to the Read or ReadMod command received ahead of the earlier issued WB command with a Retry command on the Q1 virtual channel. In response to the Retry command, the source processor may wait some predetermined time and re-issue the Read or ReadMod command.

Suppose that, after issuing a WB command, P2 wants to regain write access over the same cache line. In this case, P2 issues a ReadMod command on the Q0 virtual channel. Suppose further that the memory subsystem 302a has completed execution of the earlier WB command. In this case, upon receipt of the ReadMod command at the memory controller 418, the state of the directory entry is shown by entry 706f in which both the owner/sharer field 714 and the writer field 722 contain the ID assigned to P2. As the two values are the same, the memory controller 418 considers itself to be the owner of the cache line, and responds to the ReadMod with a FillMod command on the Q2 channel that includes a copy of the data from its memory device 422. Furthermore, as the owner/sharer field 714 already contains the ID assigned to P2, the memory controller 418 need not reenter P2's ID into this field.

If the directory entry 706f were left as is, however, a potential problem could arise should another processor, e.g., processor P4, request either a shared or a write access copy of the cache line. In response to such a request, the memory controller 418 would conclude, on the basis of the owner/sharer and writer fields 714 and 722 containing the same value, i.e., P2's ID, that memory is the owner of the cache, thereby allowing the memory controller 418 to send P4 a copy of the cache line from its memory device 422. Processor P2, however, as a result of its earlier ReadMod command, is the actual owner of the cache line. Thus, the version of the cache line about to be sent to P4 from memory device 422 could be stale. In the preferred embodiment, the memory controller 418 is configured to prevent this situation from arising.

Specifically, if the owner/sharer field 714 and writer field 722 both contain the ID assigned to a source processor that issued a ReadMod command received by the memory controller 418, then, in addition to responding with a Fill command, the controller 418 is further configured to set the writer field 722 to a predetermined value. In the preferred embodiment, the predetermined value is selected so as to not correspond to a valid system entity ID. For example, a reserved ID that is guaranteed not to be assigned to any system entity may be provided for this purpose. Entry 706h (FIG. 7) illustrates how entry 706f would appear following the receipt and servicing of a ReadMod command issued by P2. By modifying the contents of the writer field 722, the memory controller 418 ensures that P2 will once again be considered the owner of the cache line, and any requests subsequently received for the cache line will be forwarded to P2 for service, rather than being serviced out of the memory device 422 potentially in error.

Figure 8A:
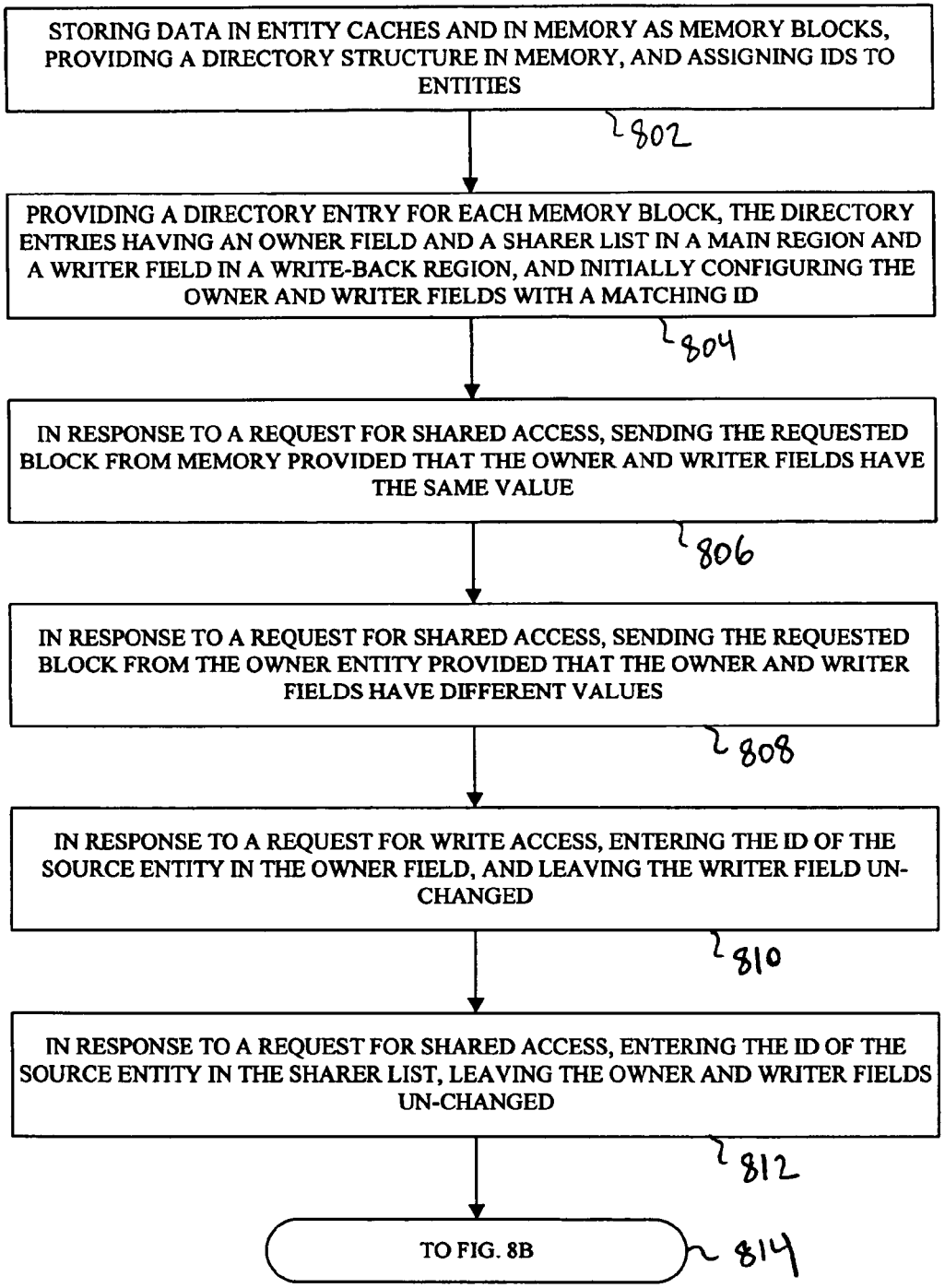
FIGS. 8A–B are a highly schematic flow chart illustrating features of the present invention.
Figure 8B:
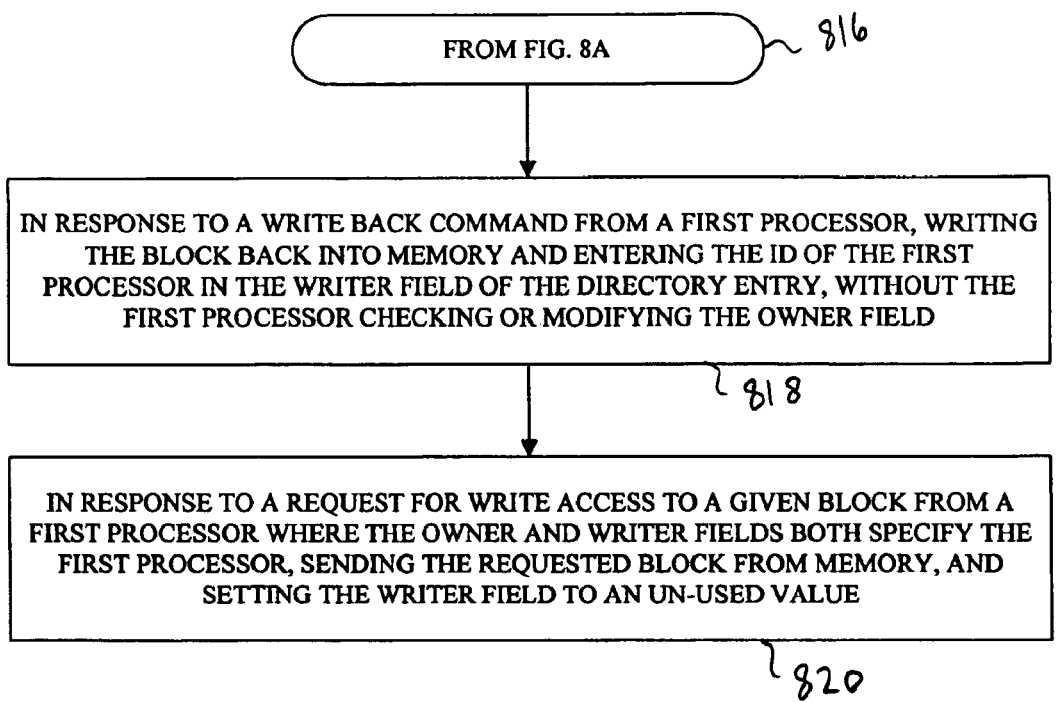

FIGS. 8A–B are a highly schematic flow-chart that illustrates, at steps 802–820, the previously described features of the present invention.

In some multiprocessor architectures, such as the SMP system described in U.S. Pat. No. 6,108,752 for a METHOD AND APPARATUS FOR DELAYING VICTIM WRITES IN A SWITCH-BASED MULTI-PROCESSOR SYSTEM TO MAINTAIN DATA COHERENCY, issued Aug. 22, 2000, which is hereby incorporated by reference in its entirety, a Transaction Tracking Table (TTT) is included to keep track of outstanding transactions issued from a multi-processing node, i.e., transactions awaiting responses from some other multi-processing node. The TTT is typically used in cooperation with a duplicate tag store (DTAG), which maintains a duplicate tag entry for all of the processor caches of the respective node, to maintain coherency of memory blocks. In the preferred embodiment of the present invention, the coherency of memory blocks is maintained without a TTT or DTAG.

The elimination of victim buffers, TTTs, and DTAGs results in substantially reduced complexity of the processor module design. Furthermore, the elimination of having to perform atomic read-modify-write cycles to write modified data back into memory saves significant system bandwidth.

Although a victim buffer was not shown in the above described embodiment, those skilled in the art will recognize that such a buffer may be included and that the present invention may be utilized to write back data from a processor's victim buffer to memory.

In addition to the multi-cube architecture illustrated in FIGS. 2 and 3, it should be understood that the present invention may be used with other shared memory multiprocessor architectures, such as meshes, trees, tori, etc. It may even be used by a single processor computer system.

The foregoing description has been directed to specific embodiments of the present invention. It will be apparent, however, that other variations and modifications may be made to the described embodiments, with the attainment of some or all of their advantages. For example, the directory 420 could be a separate memory component, such as a SRAM. Therefore, it is the object of the appended claims to cover all such variations and modifications as come within the true spirit and scope of the invention.

What is claimed is:

1. A method for writing back modified data from a cache associated with a source entity of a computer system to a main memory, the method comprising:
    providing a directory entry for the data being written back, the directory entry having an owner field, and a multi-bit writer field;
    storing the modified data in the main memory;
    configuring the multi-bit writer field to specify an identifier of the source entity as having written back the data into the main memory; and
    leaving the owner field of the directory entry unchanged.

2. A method for writing back modified data from a cache associated with a source entity of a computer system to a main memory, the method comprising:
    providing a directory entry for the data being written back, the directory entry having an owner field, and a writer field;
    storing the modified data in the main memory;
    configuring the writer field to specify the source entity as having written back the data into the main memory;
    leaving the owner field of the directory entry unchanged;
    storing data in the entity's cache and in the main memory in terms of memory blocks;
    providing a directory entry for each memory block stored at the main memory, each directory entry having an owner field and a writer field; and
    initially configuring both the owner field and writer field of the directory entries with a matching identifier (ID).

3. The method of claim 2 further comprising:
    in response to a request from the source entity for write access over a memory block, entering an identifier (ID) assigned to the source entity in the owner field of the directory entry provided for the requested memory block; and
    leaving the writer field of the directory entry unchanged.

4. The method of claim 3 further comprising:
    providing a plurality of processors, each processor having at least one processor cache;
    providing each directory entry with a sharer list field;
    in response to a request from a first processor for shared access to a first memory block, modifying the sharer list of the respective directory entry to indicate that the first processor has a shared copy of the memory block; and
    leaving the owner field and the writer field of the respective directory entry un-changed.

5. The method of claim 4 further comprising sending the first processor a copy of the requested memory block from main memory, provided that the owner field and the writer field of the respective directory entry are configured in the same manner.

6. The method of claim 5 further comprising sending the first processor a copy of the requested memory block from the cache of the entity whose ID is stored in the owner field of the respective directory entry, provided that the owner field and the writer field of the respective directory entry indicate different entities.

7. The method of claim 6 wherein the directory entries are stored at main memory along with the memory blocks.

8. The method of claim 4 further comprising:
    in response to a request from a first processor for write access to a first memory block where the owner field and writer field of the respective directory entry both contain the ID assigned to the first processor, sending the first processor a copy of the requested memory block from main memory; and
    setting the writer field of the respective directory entry to a value other than the ID assigned to the first processor.

9. The method of claim 8 wherein the writer field of the respective directory entry is set to an unused identifier.

10. In a computer system having a plurality of processors, each processor having one or more caches, and a main memory configured to store data in terms of memory blocks, the main memory accessible by the plurality of processors, a method for maintaining coherence over the memory blocks of the main memory, the method comprising the steps of:
    providing a directory entry for each memory block, each directory entry having an owner field configured to specify an owner and a writer field configured to specify a last writer of the respective memory block; and
    in response to a request from a first processor for shared access to a first memory block, sending the first processor a copy of the requested memory block from the main memory, provided that the owner field and the writer field of the respective directory entry contain the same value.

11. The method of claim 10 further comprising the steps of:
    assigning a unique identifier (ID) to each processor; and
    in response to a request for write access to a memory block, loading the owner field of the respective directory entry with the ID assigned to the requesting processor.

12. The method of claim 11 further comprising the step of writing a modified memory block from a processor cache back to main memory by loading the writer field of the respective directory entry with the ID assigned to the write back processor and storing the modified memory block in the main memory.

13. The method of claim 12 wherein the write back is performed with-out the write back processor either checking or modifying the owner field of the respective directory entry.

14. The method of claim 10 wherein
the directory is further configured to have a main region and a write back region,
the owner field is located in the main region,
the writer field is located in the write back region,
the main region includes an error correction code (ECC) field, and
the write back region includes an ECC field separate from the ECC field of the main region.

15. The method of claim 14 wherein the main region further includes a sharer list field for specifying the processors having a shared copy of the respective memory block.

16. The method of claim 10 further comprising the step of sending the first processor a copy of the requested memory block from the cache of the processor specified by the owner field of the respective directory entry, provided that the owner field and the writer field contain different values.

17. The method of claim 10 wherein the computer system is configured to have a cache coherent, non uniform memory access (CC-NUMA) architecture.

18. In a computer system having a plurality of processors, each processor having one or more caches, and a main memory configured to store data in terms of memory blocks, a directory for use in maintaining coherence of the memory blocks, the directory comprising:
an entry for each memory block, each directory entry including:
a main directory region having an owner field for specifying an owner of the memory block; and
a write-back region having a multi-bit writer field for specifying an identifier corresponding to the last processor to have written the memory block back to the main memory.

19. The directory of claim 18 wherein the main directory region further has a sharer list field for specifying which processors have a shared copy of the respective memory block.

20. The directory of claim 18 wherein
the computer system has a plurality of memory subsystems each constituting a portion of the main memory, and
the directory is distributed across the plurality of memory subsystems.

21. A method for writing back modified data from a cache associated with a source entity of a computer system to a main memory, the method comprising:
providing a directory entry for the data being written back, the directory entry having an owner field and a sharer field;
storing the modified data in the main memory;
leaving the owner field and the sharer field of the directory entry unchanged; storing data in the entity's cache and in the main memory in terms of memory blocks;
providing a directory entry for each memory block stored at the main memory, each directory entry having an owner field and a writer field; and
initially configuring both the owner field and writer field of the directory entries with a matching identifier (ID).

* * * * *

UNITED STATES PATENT AND TRADEMARK OFFICE
CERTIFICATE OF CORRECTION

PATENT NO. : 7,051,163 B2  
APPLICATION NO. : 10/263739  
DATED : May 23, 2006  
INVENTOR(S) : Stephen R. Van Doren et al.

It is certified that error appears in the above-identified patent and that said Letters Patent is hereby corrected as shown below:

In column 7, line 51, after "memory of" delete "is".

In column 8, line 21, after "it" delete "to".

In column 12, line 36, delete "PO's" and insert -- P0's --, therefor.

In column 12, line 60, after "accessed" delete "is".

In column 22, line 18, in Claim 4, delete "un-changed" and insert -- unchanged --, therefor.

In column 23, line 8, in Claim 13, delete "with-out" and insert -- without --, therefor.

Signed and Sealed this

Twenty-eighth Day of July, 2009

JOHN DOLL  
*Acting Director of the United States Patent and Trademark Office*